US 11,570,700 B2

United States Patent
Marsden et al.

(10) Patent No.: US 11,570,700 B2
(45) Date of Patent: Jan. 31, 2023

(54) CONTROLLING CONNECTIVITY OF AN ELECTRONIC DEVICE TO A MOBILE NETWORK

(71) Applicant: Eseye Limited, Guildford (GB)

(72) Inventors: Ian Marsden, Lyne (GB); Paul Mckenzie, Guildford (GB); Paul Marshall, Guildford (GB)

(73) Assignee: Eseye Limited, Guildford (GB)

( * ) Notice: Subject to any disclaimer, the term of this patent is extended or adjusted under 35 U.S.C. 154(b) by 40 days.

(21) Appl. No.: 17/194,856

(22) Filed: Mar. 8, 2021

(65) Prior Publication Data

US 2021/0289429 A1    Sep. 16, 2021

(30) Foreign Application Priority Data

Mar. 10, 2020    (GB) .................................... 2003459

(51) Int. Cl.
| | |
|---|---|
| H04W 48/16 | (2009.01) |
| H04W 8/04 | (2009.01) |
| H04W 8/18 | (2009.01) |
| H04W 8/20 | (2009.01) |
| H04W 24/08 | (2009.01) |

(52) U.S. Cl.
CPC ............. *H04W 48/16* (2013.01); *H04W 8/04* (2013.01); *H04W 8/183* (2013.01); *H04W 8/205* (2013.01); *H04W 24/08* (2013.01)

(58) Field of Classification Search
CPC ....... H04W 48/16; H04W 8/04; H04W 8/183; H04W 8/205; H04W 24/08; H04W 12/06; H04W 8/18; H04W 4/60; H04W 12/00
See application file for complete search history.

(56) References Cited

U.S. PATENT DOCUMENTS

| | | | |
|---|---|---|---|
| 5,898,783 A | 4/1999 | Rohrbach | |
| 2009/0163175 A1* | 6/2009 | Shi | H04W 12/42 455/411 |
| 2014/0011478 A1* | 1/2014 | Collins | H04W 48/06 455/411 |
| 2016/0373880 A1 | 12/2016 | Khan et al. | |

FOREIGN PATENT DOCUMENTS

| | | |
|---|---|---|
| DE | 102014010698 | 11/2015 |
| EP | 1827049 | 8/2007 |
| WO | 2016008581 | 1/2016 |

OTHER PUBLICATIONS

EP21161853.3 , Extended European Search Report, dated May 31, 2021, 8 pages.
GB2003459.1 , "Search Report", dated Aug. 11, 2020, 3 pages.

* cited by examiner

*Primary Examiner* — Said M Elnoubi
(74) *Attorney, Agent, or Firm* — Kilpatrick Townsend & Stockton LLP

(57) ABSTRACT

An approach for preventing electronic devices from repeatedly attempting to register or connect to a mobile network when they are not permitted to communicate using the mobile network. Embodiments determine whether the electronic device and/or associated SIM is permitted to communicate using the mobile network. In response to determining that the electronic device and/or SIM is not permitted to communicate using the mobile network, the contents of the SIM are modified to prevent the SIM from providing, to other components of the electronic device, communication data used to make a connection or authentication request to the mobile network.

18 Claims, 3 Drawing Sheets

CONTROLLING CONNECTIVITY OF AN ELECTRONIC DEVICE TO A MOBILE NETWORK

CROSS-REFERENCES TO RELATED APPLICATIONS

This application claims priority to United Kingdom Patent Application No. 2003459.1, filed Mar. 10, 2020. The entire contents of the foregoing patent application is incorporated herein in its entirety for all purposes.

FIELD OF THE INVENTION

The present invention relates to the field of mobile communications, and in particular to controlling connectivity of an electronic device to a mobile network.

BACKGROUND OF THE INVENTION

It is well known for electronic devices, which use mobile or cellular connections for communicating with an end server, to attempt to reconnect to a mobile/cellular network autonomously. This is particularly important for electronic devices that communicate periodically and/or without requiring a physical user input, such as a remote monitoring station. Electronic devices of this sort are becoming increasingly popular with the growth of the Internet of Things.

Usually, a modem (or processing unit controlling the same) of such an electronic device is required to detect when a connection to a mobile/cellular network has dropped, and attempt to automatically reconnect to or re-register on the mobile/cellular network. For some devices, e.g. continuous monitoring devices, the reconnection strategy can be aggressive, with regular and frequent retries. A reconnection strategy that makes frequent requests for connecting to a mobile network will ensure that a device that has been disconnected from a mobile network, e.g. due to a failure of the mobile network or because the device has been moved out of the network operator's service region, will reconnect quickly upon the mobile network becoming available again.

Typically, electronic devices operate on a subscription basis, in which the electronic devices are permitted to communicate with end servers (e.g. databases) using a mobile network, as long as a subscription continues to be paid. It is current practice to de-register the electronic device(s) from a mobile network when a subscription has expired, so that future connection attempts by the electronic device(s) are rejected by the mobile network.

There is an ongoing desire to improve the handling of electronic devices whose subscription has ended, or who are otherwise no longer permitted to communicate with end servers using the mobile network.

SUMMARY OF THE INVENTION

The invention is defined by the claims.

According to examples in accordance with an aspect of the invention, there is provided a computer-implemented method of controlling the operation of a subscriber identity module, SIM, of an electronic device, wherein the SIM is configured to be able to respond to a request from a modem or processing unit of the electronic device with communication data that enables the modem or processing unit to initiate communications with a mobile network.

The computer-implemented method comprises determining whether the electronic device and/or SIM is permitted to communicate using the mobile network; and in response to determining that the electronic device and/or SIM is not permitted to communicate using the mobile network, modifying the contents of the SIM to prevent the SIM from responding to a request from the modem or processing unit of the electronic device with communication data that enables the modem or processing unit to initiate a communication request to the mobile network.

The invention recognizes that a modem, or processing unit controlling the modem, of an electronic device may continue to repeatedly attempt to establish a connection with a mobile network, even if the electronic device (or corresponding SIM) is no longer permitted to communicate on the wireless network. This causes an increase of unnecessary (signaling) traffic on the mobile network. If a large number of non-permitted devices and/or SIMs attempt to repeatedly make contact with the mobile network, this can significantly affect the service for permitted devices or cause an increased cost for the Network operator who is required to handle the requests.

It has therefore been identified that there is a need to stop electronic devices from attempting to establish a connection with the mobile network when the electronic device (or its SIM) is not permitted to communicate using the mobile network. This lack of permission may be due to the electronic device no longer being subscribed on the mobile network (e.g. due to failure to pay a subscription fee, failure to adhere to terms and conditions or exceeding a data limit).

However, it has been further herein recognized that at design time, the manufacturer of the electronic device has no motivation to configure the electronic device itself to stop attempting to establish a connection with the mobile network, as this can add complexity and risk to the design of the electronic device for no benefit to the manufacturer of the electronic device.

The present invention proposes a different approach, to modify the contents of the SIM if the electronic device or SIM is no longer permitted to communicate using the mobile network. In particular, the SIM can be controlled to prevent the electronic device from making a connection request to the mobile network, by configuring the SIM to deny a request for information required to make a connection request (e.g. by refusing to make an identification number, e.g. IMSI, available to the modem). The present invention thereby reduces the number of connection requests made by the electronic device to the mobile network.

Typically, the operator of the mobile network also controls the manufacture and make-up of the SIM (used in the electronic device). The advantage of the present invention to such operators is therefore apparent, by allowing the operator to effectively prevent a badly behaved electronic device from attempting to connect to the network without relying upon any action of the manufacturer of the electronic device.

The communication data provided by the SIM may comprise, for example, one or more of a SIM identifier (e.g. IMSI or the like), a security key or keys and/or configuration data usable by the modem or processing unit to attempt to establish a connection with the mobile network. Preferably, the communication is authentication data required to authenticate the mobile device and/or SIM on the mobile network.

In some embodiments, the step of determining comprises using a remote system, external to the electronic device and/or SIM, of the mobile network to determine whether the electronic device and/or SIM is permitted to communicate using the mobile network.

Thus, tracking or monitoring the permissibility of the electronic device and/or SIM to connect to the network may be performed by a remote system of the mobile network (i.e. and not the electronic device itself). Suitable examples of a remote system include any backbone element of the mobile network, such as a home location register or the like.

In some embodiments, the step of modifying the contents of the SIM comprises: sending an over-the-air, OTA, message from the remote system of the mobile network to the SIM in response to the remote system determining that the electronic device and/or SIM is not permitted to communicate using the mobile network; and the SIM responding to the OTA message by modifying the contents of the SIM to prevent the SIM from responding to a request from the modem or processing unit of the electronic device with communication data that enables the modem or processing unit to initiate a communication request to the mobile network.

Thus, the remote system may send a communication to the SIM to control its contents, and thereby remotely control whether the modem or processing unit of the electronic device is able to send a communication request to the mobile network. Providing an over-the-air message to control the SIM removes the burden of monitoring connection attempts from the SIM, instead positioning such responsibility in a remote system with greater processing power.

In some embodiments, the OTA message comprises computer-implementable instructions, to be executed by the SIM, for modifying the contents of the SIM.

In some embodiments, the step of determining comprises: receiving, at the remote system, a connection request from the electronic device; determining, at the remote system, whether the electronic device and/or SIM is permitted to connect to the mobile network in response to the connection request; modifying a first counter value, stored by the remote system, each time the electronic device and/or SIM is not permitted to be connected on the mobile network following the connection request; and determining that the electronic device and/or SIM is not permitted to communicate using the mobile network in response to the first counter value reaching or breaching a first threshold counter value.

Using a counter provides the electronic device with a predetermined number of attempts to make a connection before effectively disabling the electronic device from further communicating with the mobile network, e.g. to account for errors in transmission, failures by the electronic device and/or late payment of subscription (i.e. a grace period). This would also ensure that should a process of withdrawing permission to connect be executed in error, there are a 'grace' number of authentication attempts remaining.

The remote system may comprise at least a home location register, HLR. A home location register is used to determine whether a SIM is permitted to connect to a network, i.e. whether a SIM is authorized on the mobile network and/or provisioned on the mobile network.

In some embodiments, the step of determining is performed by the SIM monitoring connection attempts of the electronic device to the mobile network.

In other words, the SIM may take the responsibility of monitoring the number of connection attempts made that are unsuccessful. This can be performed, for example, by monitoring the number of requests for the relevant information (e.g. a request for an identification number) made by the modem or processing unit and/or the accept/reject status following the connection attempt made subsequently.

The step of determining may comprises: modifying a second counter value, stored by the SIM, upon each unsuccessful connection attempt of the electronic device to the mobile network; and determining that the electronic device and/or SIM is not permitted to attempt further authentication attempts in response to the second counter value reaching or breaching a second threshold counter value.

Thus, a counter on the SIM may be modified each time the electronic device fails to connect to the mobile network. The SIM can then respond to the counter breaching a threshold by declining to provide the information needed by the modem or processing unit in order to attempt further registration attempts thus preventing the electronic device from placing any further signaling on the network. The benefits of using a counter have been previously discussed.

The computer-implemented method may further comprise a step of resetting the second counter value to a first predetermined value in response to the electronic device successfully connecting to the mobile network. This effectively ensures that the counter will not breach the threshold value if it is in an area of poor coverage and only a fraction of the registration attempts are successful.

The method optionally comprises a step of responding, at the SIM, to a reset communication or reset instruction from a component of the electronic device by setting the second counter value to a second predetermined value. This effectively provides a recovery mechanism for re-enabling the electronic device to attempt connecting to the mobile network after the counter has breached the threshold value.

The reset communication may be provided from the remote system as an OTA command during an authenticated communication session. In other examples, the reset command may be issued from the device, e.g. by sending instructions from the modem to the SIM, which may be executed only when the device provides a secret key to the SIM.

In some examples, a secret key may be provided by a user of the electronic device, so that the reset communication can only be provided in response to a manual intervention.

In some embodiments, there is a limited number of times that the second counter value can be set to the second predetermined value without the electronic device making a successful connection to the mobile network. In other words, there may be a third counter value (or "reset counter value") stored by the SIM, wherein the third counter value is modified (e.g. incremented) in response to a reset communication and the SIM is adapted to not set the second counter value to the second predetermined value in response to the third counter value reaching or breaching a predetermined threshold. The third counter value may be reset, for example, in response to the electronic device successfully connecting to the mobile network.

The step of modifying the contents of the SIM may comprise performing one or more of the following steps: destroying data of the SIM required for providing a valid response to the modem or processing unit for enabling the modem or processing unit to initiate a communication request to the mobile network; rewriting data of the SIM, required for providing a valid response to the modem or processing unit for enabling the modem or processing unit to initiate a communication request to the mobile network, with invalid values; and/or adjusting an access permission of the SIM to prevent the SIM from providing a valid response to the modem or processing unit for enabling the modem or processing unit to initiate a communication request to the mobile network.

In some embodiments, where data of a SIM is destroyed or rewritten, the original data may be stored in a separate or quarantined file of the SIM, so that it can be replaced in response to the modem or processing unit being permitted to re-access said information or use said information, e.g. if a counter value is changed.

There is also proposed a computer program product comprising computer program code that, when executed on a computing device having a processing system, cause the processing system to perform all of the steps of any herein described method.

The is also proposed a subscriber identity module, SIM, for an electronic device, wherein the SIM is configured to be able to respond to a request from a modem or processing unit of the electronic device with communication data that enables the modem or processing unit to initiate communications with a mobile network.

The SIM is adapted to: determine whether the electronic device and/or SIM is permitted to communicate using the mobile network; and in response to determining that the electronic device and/or SIM is not permitted to communicate using the mobile network, modify the contents of the SIM to prevent the SIM from responding to a request from the modem or processing unit of the electronic device with communication data that enables the modem or processing unit to initiate a communication request to the mobile network.

There is also proposed a mobile network system for controlling the operation of a subscriber identity module, SIM, of an electronic device, wherein the SIM is configured to be able to respond to a request from a modem or processing unit of the electronic device with communication data that enables the modem or processing unit to initiate communications with a mobile network of the mobile network system.

The mobile network system comprises a remote system adapted to: determine whether the electronic device and/or SIM is permitted to communicate using the mobile network; and in response to determining that the electronic device and/or SIM is not permitted to communicate using the mobile network, modify the contents of the SIM to prevent the SIM from responding to a request from the modem or processing unit of the electronic device with communication data that enables the modem or processing unit to initiate a communication request to the mobile network.

The mobile network system may further comprise the electronic device itself. The electronic device may comprise at least the modem or processing unit and the SIM, as well as any other component suitable for an electronic device (such as a processing unit, user interface, sensor and so on).

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
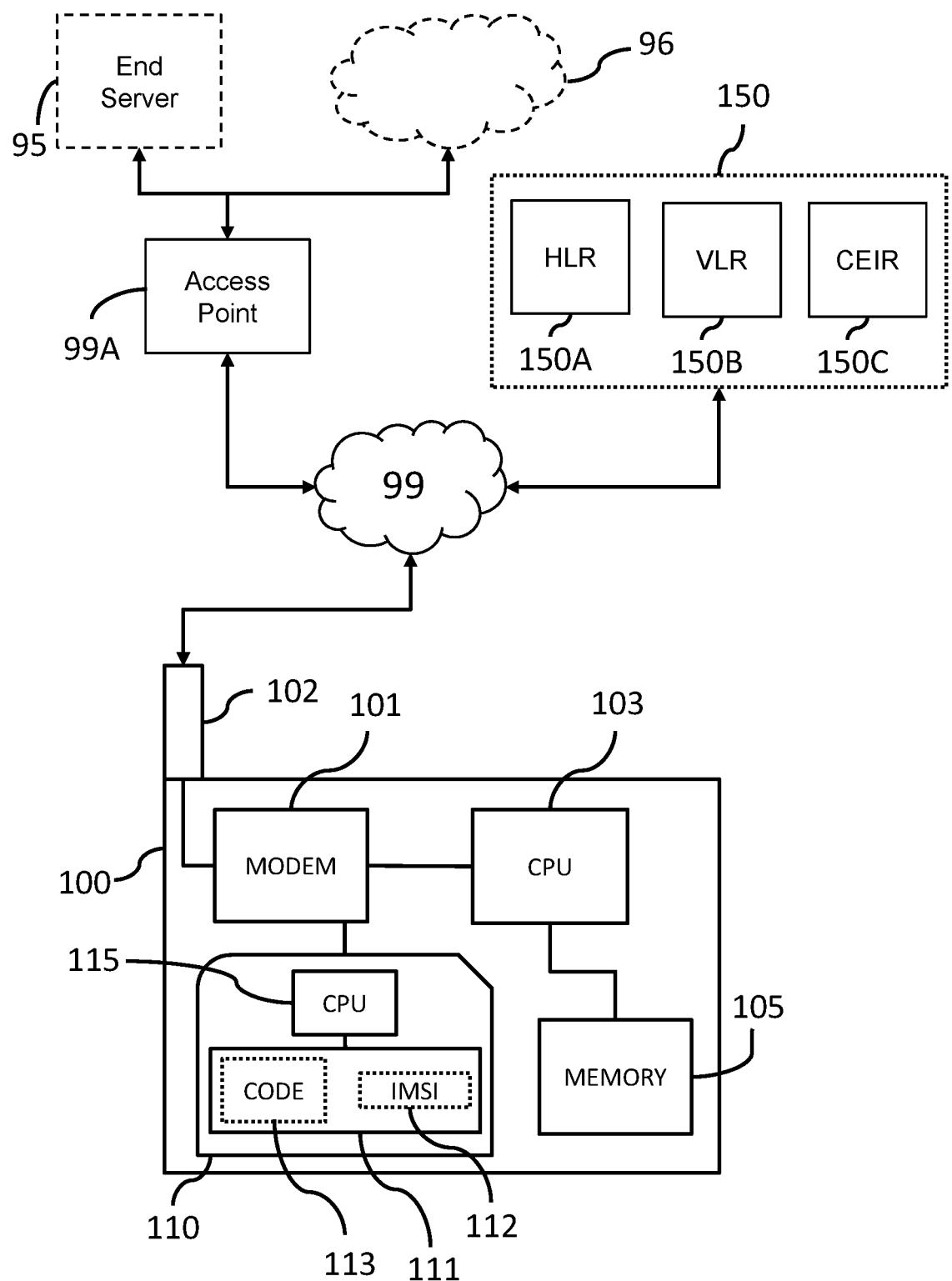
FIG. 1 illustrates a mobile network system in an embodiment may be employed.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an approach for preventing electronic devices from repeatedly attempting to register or connect to a mobile network when they are not permitted to communicate using the mobile network. Embodiments determine whether the electronic device and/or associated SIM is permitted to communicate using the mobile network. In response to determining that the electronic device and/or SIM is not permitted to communicate using the mobile network, the contents of the SIM are modified to prevent the SIM from providing, to other components of the electronic device, communication data used to make a connection or authentication request to the mobile network.

The present invention relies upon the recognition that an operator of a mobile network can exert a level of control over the operation of a SIM, e.g. using OTA processes or by virtue of manufacturing the SIM, so that it is able to prevent unruly devices from repeatedly attempting to communicate on the mobile network when they are no longer permitted to do so. This reduces an amount of (signaling) traffic on the mobile network.

Embodiments of the invention may be employed in any (e.g. subscriber-based) mobile network, in which it would be desirable for electronic devices or SIMs to be deprovisioned with respect to the mobile network.

FIG. 1 illustrates a mobile network system 1 according to an embodiment of the invention. The mobile network system 1 comprises an electronic device 100.

The electronic device 100 is adapted to wirelessly communicate with one or more other devices (such as an end server 95 and/or device connected to an external network 96) using a mobile network 99. The mobile network 99 may, for example, enable the electronic device 100 to communicate with the one or more other devices via one or more access points 99A.

The electronic device 100 is adapted to wirelessly communicate with the mobile network via an antenna system 102, which is controlled by a modem 101. The modem may itself be controlled by a (central) processing unit/module 103 of the electronic device. Methods of communicating using a mobile network would be readily apparent to the skilled person.

However, in order to communicate with other devices, such as the end server(s) and/or external network(s), the electronic device 100 needs to be registered or otherwise authenticated to the mobile network. In other words, the electronic device 100 must be permitted to communicate using the mobile network. The mobile network 99 may be adapted to deny communication request from the electronic device 100 if it is not permitted to communicate (with the other devices) using the mobile network.

In order to check whether the electronic device 100 is permitted to communicate using the mobile network 99, a remote system 150 may be used. The remote system 150 processes communication data provided by the electronic device 100 to establish whether the electronic device 100 is permitted to communicate (e.g. with other devices) using the mobile network 99, e.g. by consulting a database and/or initiating an authentication process. Determining whether an electronic device 100 is permitted to communicate using the mobile network 99 may be functionally equivalent to a process of authenticating/registering the electronic device on the mobile network.

In other words, in at least one embodiment, the concept of being "permitted to communicate using the mobile network" is functionally equivalent to a concept of being "authenticated on the mobile network" or "registered on the mobile network", so that these terms may be used interchangeably.

The remote system 150 may comprise any unit suitable for establishing, deciding or determining whether the electronic device and/or SIM is permitted to communicate (e.g. with other devices) using the mobile network 99. Suitable units include a home location register (HLR) 150A, a visitor location register (VLR) 150B, a Central Equipment Identity Register (CEIR) 150C and so on. The remote system 150 may comprise any combination of these and/or other units that would be suitably known to the skilled person.

The remote system 150 may, for example, be connected to elements of the backbone of the network 99, e.g. a mobile switching center (MSC) or the like. Similarly, the mobile network 99 may comprise other backbone modules, such as a base station (subsystem) and the like. The skilled person would readily understand the structure of a mobile network.

Methods of authenticating an electronic device 100 on a mobile network 99 are well known to the skilled person, e.g. by employing any of the CDMA, TDMA and/or GSM standard protocols.

The communication data used to authenticate the electronic device on the mobile network 99 is provided by a subscriber identity module (SIM) 110, which is either fixed within or removable from the electronic device 100. The SIM 110 comprises a (central) processing unit 115 and a memory 111. The processing unit 111 responds to instructions or requests passed to it by the modem 101 of the electronic device 100, e.g. by executing code 113 stored in the memory 111.

The SIM can provide identifying information (or other communication data) to other components of the electronic device, such as the modem 101, which can form part of the overall communication data used to authenticate the electronic device. In particular, the modem 101 may attempt to connect or register on the mobile network 99, and may contact the SIM to obtain identifying information for registering on the mobile network.

Other examples of communication data that could be provided by a SIM, in addition or in place of identifying information, may include security keys (e.g. required for encrypting a communication over the mobile network) and/or configuration data (e.g. for configuring how to communicate data over the mobile network).

The SIM 110 can also be used during an authentication method initiated by the (home location register of) the remote system 150, e.g. by executing code 113.

Typically, the SIM provides at least a SIM identifier (such as an international mobile subscriber identity (IMSI), Integrated Circuit Card Identifier (ICCI) and/or Embedded Identity Document (EID)) 112, which is passed to the (HLR of the) remote system 150. The remote system 150 compares the identifier to a database, to determine whether the mobile phone 100 having the SIM 110 is permitted to communicate using the mobile network 99.

Other data can be used to decide whether an electronic device 100 is permitted to communicate using the mobile network 99. For example, an electronic device is commonly associated with a device identifier, such as an International Mobile Equipment Identity (IMEI) or Mobile equipment identifier (MEI), which may be stored in storage unit 105. The device identifier may be communicated to the remote system by the electronic device 100, and could be used to determine whether the electronic device 100 is permitted to communicate using the mobile network, e.g. by a CIER 150C—which may be integrated into the HLR 150 or provided as a separate element.

Thus, one or more units of a remote system (connected to the mobile network 99), such as the home location register 150A or (central) equipment identity register 150C (CIER), may be used to control whether or not the electronic device 100 is permitted to communicate using the mobile network 99.

Presently, electronic devices 100 can be configured to repeatedly or iteratively attempt to connect to a mobile network, even if they are not permitted to communicate using the mobile network, e.g. if they have been deprovisioned by the HLR.

The process of attempting to connect to a mobile network typically comprises the modem 101 (and/or processing unit 103) requesting communication data from the SIM, such as the IMSI. This information is required in standard authentication protocols to authenticate the electronic device 100 on the network.

The present invention recognizes that repeated attempts to connect to a mobile network by a device (not permitted to communicate using the mobile network) can significantly increase signaling traffic to the mobile network. The present invention proposes to exploit the standard authentication process to prevent an electronic device from being able to repeatedly attempt to connect to a mobile network, by modifying the contents of the SIM.

Figure 2:
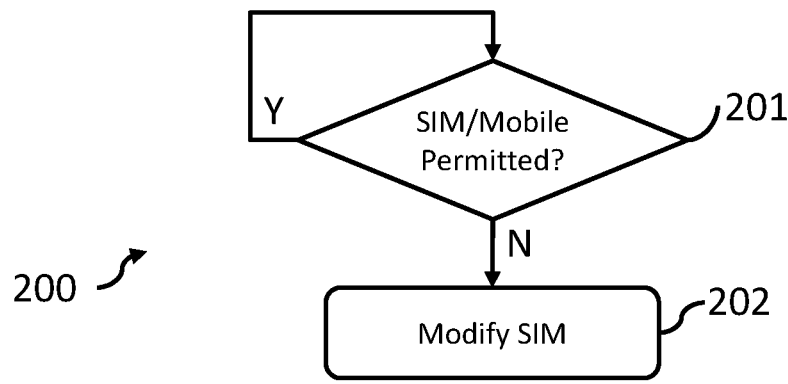
FIG. 2 is a flowchart illustrating a generic method according to an embodiment.

FIG. 2 illustrates a generic method 200 according to an embodiment of the invention. The method may be performed by the remote system or the SIM of the electronic device, or the two working in tandem.

The method 200 comprises a step 201 of determining whether the electronic device and/or SIM is permitted to communicate using the mobile network. Various embodiments for this process will be described later.

The method 200 further comprises a step 202 of, in response to determining that the electronic device and/or SIM is not permitted to communicate using the mobile network, modifying the contents of the SIM to prevent the SIM from responding to a request from the modem or processing unit of the electronic device with communication data that enables the modem or processing unit to initiate a communication request to the mobile network.

Step 202 may comprise, for example, controlling the SIM to rewrite a stored SIM identifier (e.g. IMSI) with non-valid values, e.g. all '0' or 'F'. This will invalidate the SIM identifier, so that a request to the SIM (e.g. from the modem or processing module) will prevent the SIM from responding with appropriate communication data.

In another example, step 202 may comprise destroying or deleting data of the SIM required for providing a valid response, e.g. deleting the SIM identifier or deleting code required to validly respond to a request for an SIM identifier (e.g. from the modem or processing module of the mobile).

In another example, code of the SIM may be activated so that it responds to a request for an SIM identifier with invalid data, or other information such as "Not Ready" or "Access Denied" to prevent the SIM identifier from being passed back in response to the request.

In yet another example, security requirements for accessing a SIM may be changed or altered, e.g. by modifying a password or code required to validly access the SIM or cause the SIM to perform desired actions. Thus, step 202 may comprise adjusting an access permission of the SIM to prevent the SIM from providing a valid response to the modem or processing unit for enabling the modem or processing unit to initiate a communication request to the mobile network.

Various other methods for modifying a SIM to prevent it responding to a request with valid communication data will be apparent to the skilled person.

Figure 3:
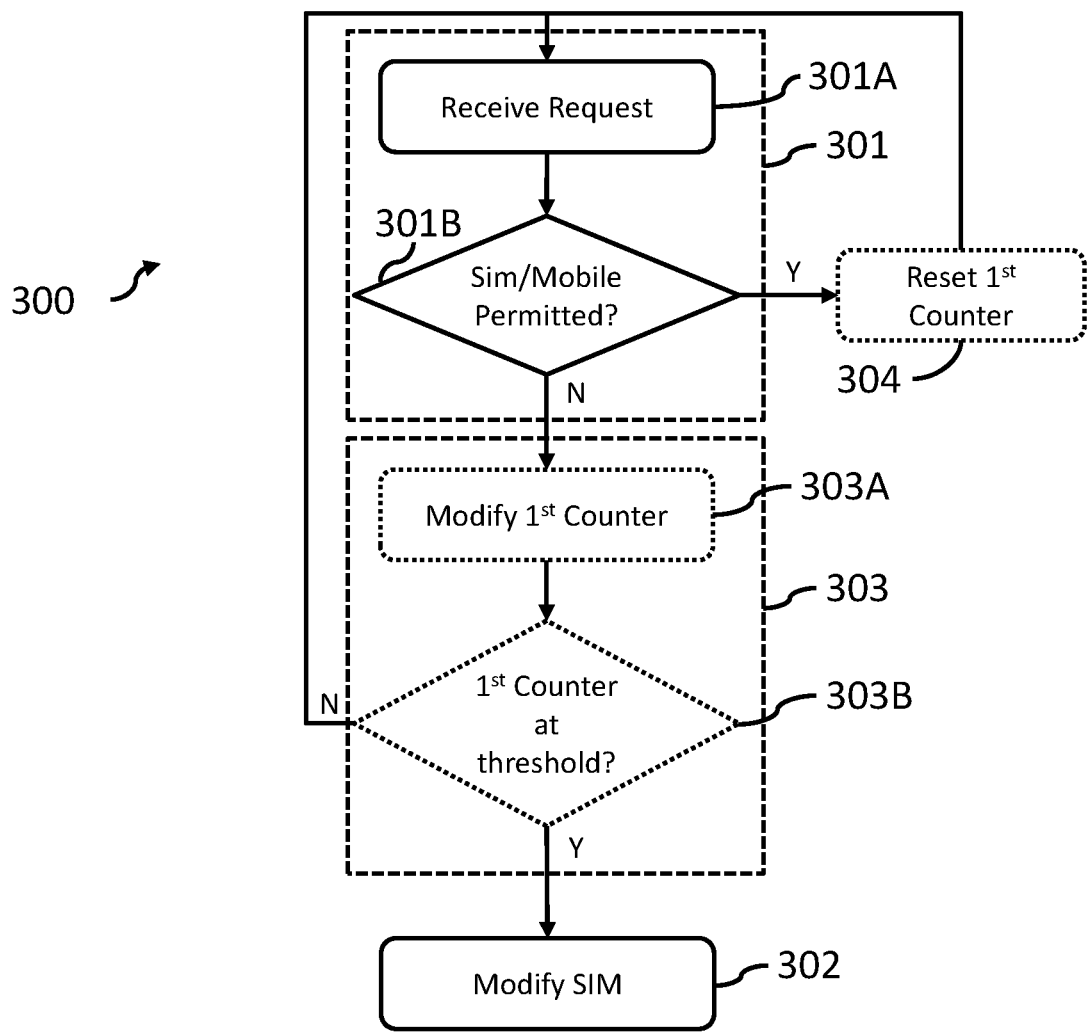
FIG. 3 is a flowchart illustrating a method according to an embodiment.

FIG. 3 illustrates a method 300 according to one embodiment of the invention, where the process is carried out by the remote system that authenticates the electronic device on the mobile network.

The method 300 comprises a step 301 of determining whether a SIM, associated with an electronic device, or the electronic device itself is not permitted to communicate using the mobile network.

Step 301 may comprise a step 301A of receiving a connection request from the electronic device, which connection request may comprise a SIM identifier (e.g. IMSI) and/or a device identifier (e.g. IMEI). Of course, other communication data may be contained in the connection request. The connection request may, for example, be an authentication request for requesting authentication of the electronic device on the mobile network.

Of course, the method 300 may idle at step 301A until a connection or communication request is received from the electronic device.

Continuing step 301, the remote system may then perform a step 301B of processing the connection request to determine whether or not the electronic device and/or SIM (associated with the electronic device) is permitted to communicate using the mobile network.

In some examples, step 301B may comprise (a computer/processor in the remote system) comparing the SIM/device identifier to one or more databases that identify whether the SIM and/or mobile is permitted to communicate using the mobile network. For example, the remote system may use a subscription database that details which SIMs (i.e. SIM identifiers) are permitted to communicate using the mobile network (e.g. if a subscription to a mobile network for the SIM has been kept up to date). As another example, the remote system may use a blacklist database to process a device identifier to identify whether a device has been blacklisted (e.g. marked as stolen) to determine whether the electronic device is permitted to communicate using the mobile network.

Other methods and databases for use in determining whether a SIM and/or electronic device is permitted to communicate using a mobile network, in response to a connection request, will be apparent to the skilled person, and could be used in step 301B.

In response to determining that an electronic device and/or SIM associated with the electronic device is not permitted to communicate using the mobile network, the method 300 moves to a step 302.

Step 302 comprises using the remote system to instruct the SIM to modify its contents to prevent the SIM from responding to a request from the modem or processing unit of the electronic device with communication data that enables the modem or processing unit to initiate a communication request to the mobile network.

For example, step 302 may comprise sending an over-the-air, OTA, message from the remote system of the mobile network to the SIM in response to the remote system determining that the electronic device and/or SIM is not permitted to communicate using the mobile network.

Over-the-air (OTA) is a well-known platform by which a mobile network operator, e.g. the operator of the remote system, and send and receive services to and from a SIM. The OTA platform is commonly used for providing software updates, configuration settings and/or encryption keys to a SIM. The proposed embodiments suggest to utilize this platform to control the SIM to prevent or forbid it from providing communication data in response to a request from a modem or processing unit (or processing module controlling the modem or processing unit).

In an embodiment, the SIM may respond to the OTA message by modifying the contents of the SIM to prevent the SIM from responding to a request from the modem or processing unit of the electronic device with communication data that enables the modem or processing unit to initiate a communication request to the mobile network. Another possible response by the SIM will be described later.

In some embodiments, the OTA message comprises computer-implementable instructions, to be executed by the SIM, for modifying the contents of the SIM. In other embodiments, the OTA message comprises a request for the SIM to modify its contents (of the SIM), where the SIM itself stores the appropriate instructions for modifying the contents in response to the request.

Other methods of controlling a SIM using a remote system will be apparent to the skilled person, e.g. including an instruction or trigger code in place of the "random number" (RAND) that would typically be sent to a permitted SIM in response to an connection request by an electronic device.

In some examples, step 302 may comprise the remote system temporarily permitting the SIM or electronic device to communicate using the wireless network (e.g. temporarily acquiescing to a registration/authentication request), to enable the OTA (or other format) message to be sent to the SIM. After the OTA message has been sent to the SIM or electronic device, the remote system may revoke the SIM or electronic devices permission to communicate using the wireless network, e.g. de-authenticate the SIM or electronic device.

Some embodiments may comprise a further step 303, which is performed after determining that the SIM or electronic device is not permitted to communicate using the mobile network. The step 303 effectively comprises counting a number of times that a connection request fails, e.g. the number of times it is determined that the electronic device and/or SIM is not permitted to connect to the mobile network. When this number of times reaches a predetermined value, then step 302 is performed. Otherwise, the method reverts back to step 301 (i.e. waiting for a connection or communication request).

Step 303 helps ensure that should a termination process (i.e. a SIM or electronic device be erroneously identified as being not permitted to communicate using the mobile network) be executed in error, there are a 'grace' number of authentication attempts remaining.

Step 303 may also help ensure that an operator of the electronic device is given a grace period to attend to any problems with their subscription to the mobile network, e.g. paying any relevant subscription fees.

Step 303 may comprise a step 303A of modifying a first counter value, stored by the remote system, each time the electronic device and/or SIM is not permitted to be connected on the mobile network following the connection request. The first counter value may be an incremental or decremental counter. In other words, modifying the first counter value may comprise incrementing the counter value (e.g. by 1) or decrementing the counter value (e.g. by 1).

Step 303 may also comprise a step 303B of comparing the first counter value to a first threshold counter value to determine whether or not the electronic device is not permitted to communicate using the mobile network. If the first counter value has reached and/or breached the first threshold counter value, then the method moves to step 302.

Step 303B may comprise determining if the first counter value is greater than (and optionally equal to) the first threshold counter value. This embodiment may be used where the modification to the first counter value in step 303A is to increment the first counter value.

Step 303B may comprise determining if the first counter value is less than (and optionally equal to) the first threshold counter value (which, in this example, may be equal to 0). This embodiment may be used where the modification to the first counter value in step 303A is to decrement the first counter value.

The first counter value may be initialized to a predetermined value (e.g. 0 for an incremental counter or a predetermined non-zero number for a decremental counter).

In some embodiments, the first counter value is reset to the predetermined/initialized value in response to the electronic device successfully connecting to the mobile network. Method 300 may therefore comprise an additional step 304 of resetting the first counter value to the predetermined/initialized value in response to determining (in step 301) that the SIM and/or mobile device is permitted to communicate using the mobile network.

The size of the first threshold value and/or predetermined/initialized value (depending on whether an incremental or decremented counter is used) may be calculated or estimated to give an expected time before the counter expires. For example, 1 month based on the electronic device's normal behavior. This can be calculated based on the frequency and/or number of requests made by the electronic device to communicate using the mobile network, which could be monitored for a predetermined period of time before initiating the method 300.

In other words, a method according to an embodiment may comprise calculating a number of unsuccessful connection/authentication requests permitted before executing the method 300. The calculating may be based on an average frequency of requests made by the electronic device (e.g. a number of requests made within a predetermined period of time), and may be performed so that the electronic device is permitted to make communication requests for a predetermined period of time, e.g. a week, a month, two months and so on.

In other words, the number of 'grace' connection/authentication attempts configured can be controlled.

In another method, rather than using a counter in step 303, a timer may be used. Step 303 may comprise triggering a timer in response to an unsuccessful communication request from the SIM and/or electronic device, and moving to step 302 when the timer reaches a predetermined value.

Of course, if a successful communication request from the SIM and/or electronic device is made whilst the timer is running, then the timer can be stopped and reset (e.g. in place of step 304).

Of course, some embodiments may comprise using both a timer and a counter.

The described step 301 is only one embodiment for the enabling the remote system to determine whether a SIM, associated with an electronic device, or the electronic device itself is not permitted to communicate using the mobile network. In another example, a termination request is received from an external device (e.g. a controller of the mobile network) for terminating the registration of the SIM or electronic device on the mobile network. In this example, step 301 may comprise determining that the SIM or electronic device is not permitted to communicate using the mobile network in response to this termination request.

Typically, in response to such a termination request, a home location register processes the termination request to deprovision the SIM or electronic device on the mobile network. In preferred embodiments, the step 302 is performed before the home location register processes the termination request.

This process could be combined and/or performed in parallel to step 301 described in FIG. 3.

FIG. 3 effectively introduces and discloses a method of deciding and controlling whether the electronic device is able to initiate a communication request with the mobile network, which takes place remotely to the electronic device (i.e. at the remote system).

However, in some embodiments, the SIM itself may be adapted to decide and control whether the electronic device is able to initiate a communication request with the mobile network. This may be performed in addition to or instead of the process taking place with the remote system.

Figure 4:
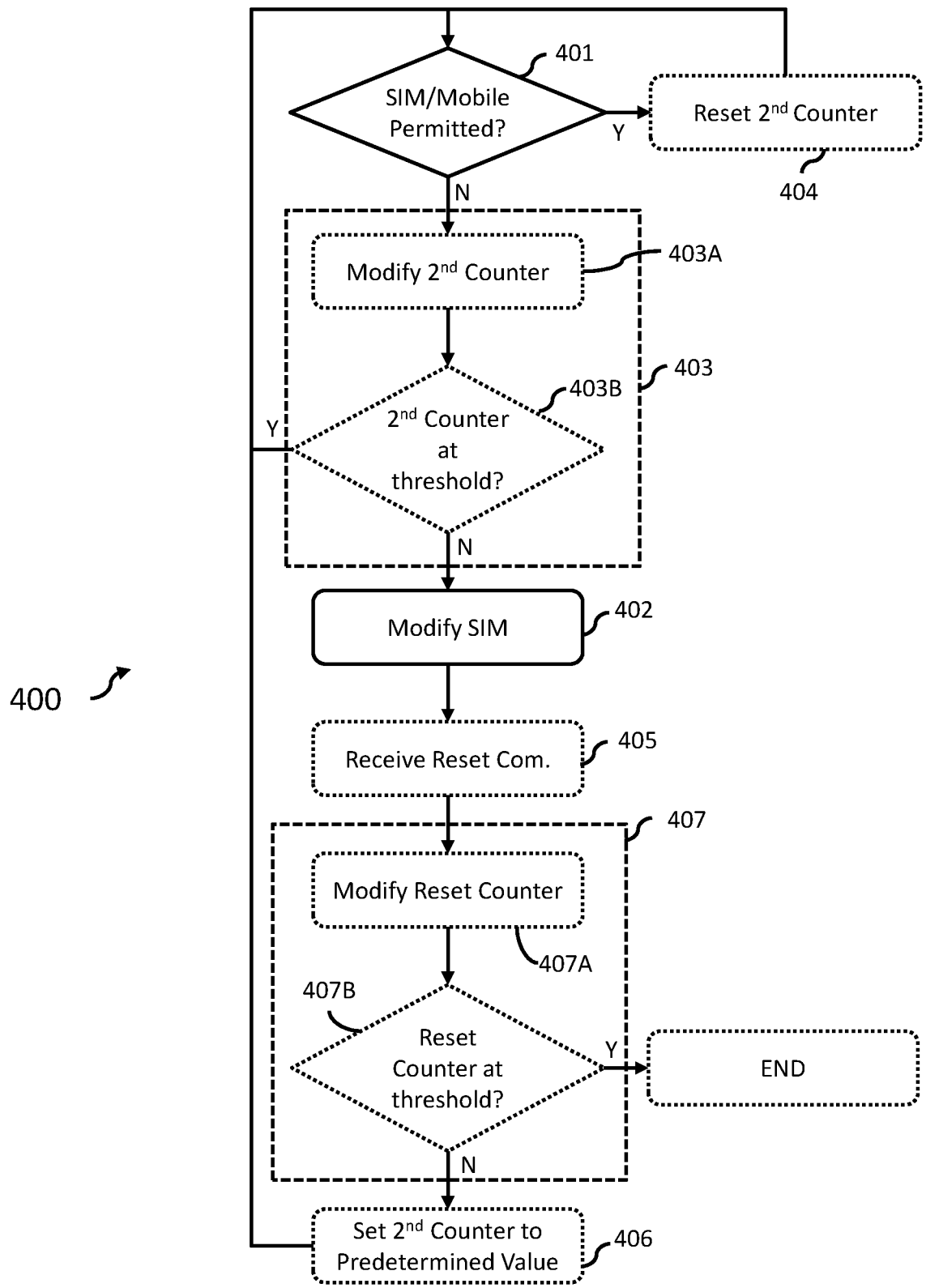
FIG. 4 is a flowchart illustrating a method according to another embodiment.

FIG. 4 illustrates a method 400 according to another embodiment of the invention, which is performed by the SIM. Method 300 and method 400 are both separate embodiments of the invention, and may be performed alongside one another or independently, depending upon implementation details.

The method 400 comprises a step 401 of determining whether (or not) the electronic device and/or SIM is permitted to communicate using the mobile network. Step 401 could be performed in a number of ways.

In some embodiments, step 401 comprises inferring that an electronic device and/or SIM is not permitted to communicate using the mobile network by the number of requests, e.g. within a predetermined period of time, for communication data (from the SIM) made by the modem and/or processing module controlling the modem. For example, if multiple requests for communication data (such as an IMSI) are made within a predetermined time period, e.g. one hour, then it can be inferred that the electronic device and/or SIM is not permitted to communicate using the mobile network.

In preferable embodiments, step 401 may comprise receiving a communication from the remote system that the electronic device and/or SIM is not permitted to communicate using the mobile network, e.g. in the form of an OTA communication or the like. In other words, step 401 may comprise determining whether the electronic device and/or SIM has been explicitly rejected (i.e. registration denied) from the network. This embodiment is particularly useful if method 300, described with reference to FIG. 3, is performed.

The method 400 may assume (i.e. by default) that the electronic device and/or SIM is permitted to communicate using the mobile network if there is no indication to the contrary. Thus, the method 400 may effectively idle at step 401 until it is determined that the electronic device and/or SIM is not permitted to communicate using the mobile network.

The method 400 comprises a step 402 which is performed in response to step 401 determining that the electronic device and/or SIM is not permitted to communicate using the mobile network.

Step 402 comprises modifying the contents of the SIM to prevent the SIM from responding to a request from the modem or processing unit of the electronic device with communication data that enables the modem or processing unit to initiate a communication request to the mobile network. Suitable methods of modifying the contents of the SIM have been previously described with reference to FIG. 2.

In some further embodiments, the method 400 may comprise a further step 403 that enables an operator of the electronic device to be given a grace period to attend to any problems with their subscription to the mobile network, e.g. paying any relevant subscription fees. Step 403 is analogous to step 303 of method 300.

In particular examples, step 403 may comprise a step 403A of modifying a second counter value, stored by the SIM, upon each unsuccessful connection attempt of the electronic device to the mobile network. Step 403A may comprise incrementing (e.g. by 1) the second counter value or decrementing (e.g. by 1) the second counter value.

The second counter values is labelled as the "second" counter value to distinguish it from the "first counter value" introduced in method 300. It is not essential for the first counter value to exist in some embodiments, and the skilled person would be able to relabel the second counter value accordingly.

In other words, step 403A may be performed in response to step 401 determining that the electronic device and/or SIM is not permitted to communicate using the mobile network.

Step 403 may further comprise a step 403B of determining whether the second counter value has reached or breached a second threshold counter value. In response to the second counter value reaching or breaching a second threshold counter value, the method moves to step 402, otherwise the method reverts back to step 401.

Step 403B may comprise determining if the second counter value is greater than (and optionally equal to) the second threshold counter value. This embodiment may be used where the modification to the second counter value in step 403A is to increment the second counter value.

Step 403B may comprise determining if the second counter value is less than (and optionally equal to) the second threshold counter value (which, in this example, may be equal to 0). This embodiment may be used where the modification to the second counter value in step 403A is to decrement the second counter value.

The second counter value may be initialized to a second predetermined value (e.g. 0 for an incremental counter or a predetermined non-zero number for a decremental counter).

In some embodiments, the second counter value is reset to the predetermined/initialized value in response to the electronic device successfully connecting to the mobile network. Method 400 may therefore comprise an additional step 404 of resetting the second counter value to the predetermined/initialized value in response to determining (in step 401) that the SIM and/or electronic device is permitted to communicate using the mobile network.

The size of the second threshold value and/or predetermined/initialized value (depending on whether an incremental or decremented counter is used) may be calculated or estimated to give an expected time before the counter expires. For example, 1 month based on the electronic device's normal behavior. This can be calculated based on the frequency and/or number of requests made by the electronic device to communicate using the mobile network, which could be monitored for a predetermined period of time before initiating the method 400.

In other words, a method according to an embodiment may comprise calculating a number of unsuccessful connection/authentication requests permitted before executing the method 300. The calculating may be based on an average frequency of requests made by the electronic device (e.g. a number of requests made within a predetermined period of time), and may be performed so that the electronic device is permitted to make communication requests for a predetermined period of time, e.g. a week, a month, two months and so on.

In other words, the number of 'grace' connection/authentication attempts configured can be controlled.

In another method, rather than using a counter in step 403, a timer may be used. Step 403 may comprise triggering a timer in response to determining whether (or not) the electronic device and/or SIM is permitted to communicate using the mobile network and moving to step 402 when the timer reaches a predetermined value.

Of course, if a successful communication request from the SIM and/or electronic device is made whilst the timer is running, then the timer can be stopped and reset (e.g. in place of step 404).

Of course, some embodiments may comprise using both a timer and a counter, and these embodiments may be integrated accordingly.

The SIM may be further adapted to permit a limited boost to the second counter value, e.g. to enable a user or the electronic device to manually configure the SIM to permit at least some further authentication requests to be made by the electronic device. This may give the electronic device the opportunity to reconnect to the mobile network some time (i.e. a period of time) after it has been deprovisioned (e.g. if an operator of the electronic device decides to re-initiate their subscription).

This effectively provides a recovery or "reserve tank" mechanism for the SIM.

This process may be performed after step 402 has been performed, e.g. when the SIM has already been configured to prevent the SIM from responding to a request for communication data with communication data that enables an authentication/connection request to be made by the modem (or processing module controlling said modem). Alternatively, this process may be performed completely separately to the method 400 (e.g. in parallel thereto).

The method 400 may therefore further comprise a step 405 of determining whether a reset instruction/communication has been received from a local interface (e.g. of the electronic device, such as the modem and/or the processing module controlling the modem). If no reset communication is received, then the method may simply repeat step 405, i.e. idle at step 405, until a reset instruction is received.

If a reset communication is received, then the method may move to a step 406 of responding, at the SIM to a reset communication or reset instruction from a component of the electronic device by setting the second counter value to a third predetermined value.

The third predetermined value may be different or the same as the second predetermined value. Preferably, the third predetermined value is configured so that the electronic device is permitted fewer authentication/connection requests than if the second predetermined value were used instead. The precise value will depend upon the type of modification made to the second counter value (e.g. incremental or decremental).

In some embodiments, the reset instruction and/or communication will only be acted upon if an authenticated communication session exists between the SIM and the component providing the instruction/communication. This authenticated communication session may be initiated only when the component provides a secret key, such as an administrative key (e.g. ADM1), to the SIM. This may help avoid a badly behaved or malicious user/application from successfully boosting the second counter value without express permission from the mobile network operator, who would be required to disclose or provide a secret/administrative key at the point the user/application needs to use the reserve tank.

In some embodiments, the method is adapted so that the reset communication/instruction can only be sent a maximum number of times, e.g. without the electronic device being authenticated on the mobile network. This effectively limits the number of times the "reserve tank" can be used. This process may be performed in a step 407, which is logically located between steps 405 and 406.

Thus, in some embodiments, the method comprises a step 407A of modifying a reset counter value (stored in the SIM) in response to receiving a reset communication/instruction, and determining in a step 407B whether (or not) the reset counter value has reached or breached a predetermined reset counter threshold. If the reset counter value has reached or breached a predetermined reset counter threshold, the method ends (i.e. and no modification is made to the second counter value. Otherwise, the method moves to step 406.

The reset counter value may be relabeled the "third counter value".

The reset counter value may be reset to an initialized reset counter value in response to the electronic device successfully connecting to the mobile network, i.e. in response to the SIM/mobile being permitted to communicate using the mobile network (step 404).

Step 402 may be appropriately configured to enable this "reserve tank" process to take place.

For example, where step 402 comprises overwriting a stored IMSI (or other SIM identifier) with invalid information, the originally stored IMSI (or other SIM identifier) may be securely stored elsewhere in the SIM, and only made accessible to the SIM itself (e.g. using appropriate security settings).

Of course, if present, steps 405, 406 and 407 (if present) may be performed in a separate parallel process (e.g. rather than being integrated into the method 400 as illustrated).

To increase a level of control over the mobile network system, any of the aforementioned counter values, predetermined values, thresholds or timers (where appropriate) may be updated or modified by an operator of the mobile network. This could, for example, allow a first counter value stored and used by the remote system to be reset by a network operator (e.g. to override an accidental de-provisioning of the electronic device).

Counter values, thresholds and timers stored on the SIM may be updated using an over-the-air process.

This process may be particularly useful to enable an operator of the remote system to directly set the second counter value stored at a SIM to be such that the second counter value reaches or breaches the second threshold value for that SIM. This can be used to effectively instruct the SIM to prevent communication data from being passed to the modem and/or processing module of the electronic device. This effectively enables the standard process performed by the SIM to be bypassed (e.g. if the electronic device is behaving badly on the network, e.g. repeatedly sending a substantial number of requests).

Where appropriate, the term "mobile network" may be replaced by the term "cellular network", as the two terms are considered to be semantically identical. Suitable examples of electronic devices include mobile devices, as well as fixed devices that use a mobile/cellular network to communicate (such as a remote monitoring device).

Ordinal numbers (e.g. "first", "second" and so on) have been used purely to distinguish different elements from one another for the sake of clarity, and reference to a non-"first" (e.g. "second" or "third") element does not necessitate that a "first" element be present. The skilled person would be capable of relabeling any such elements as appropriate (e.g. relabeling a "second" element as a "first" element if only the second element is present).

Reference to the phrase "whether a SIM is permitted to connect to a network" (or semantically similar) is intended to be synonymous with the phrase "whether an electronic device that uses the SIM is permitted to connect to a network". In the context of the present invention "permitted to communicate using a mobile network" is considered synonymous with the phrases "authorized on the mobile network", "provisioned by the mobile network", "registered on the mobile network" and so on.

The skilled person would be readily capable of developing a processing system for carrying out any herein described method. Thus, each step of the flow chart may represent a different action performed by a processing system, and may be performed by a respective module of the processing system.

Embodiments may therefore make use of a processing system. The processing system can be implemented in numerous ways, with software and/or hardware, to perform the various functions required. A processor is one example of a processing system which employs one or more microprocessors that may be programmed using software (e.g., microcode) to perform the required functions. A processing system may however be implemented with or without employing a processor, and also may be implemented as a combination of dedicated hardware to perform some functions and a processor (e.g., one or more programmed microprocessors and associated circuitry) to perform other functions.

Examples of processing system components that may be employed in various embodiments of the present disclosure include, but are not limited to, conventional microprocessors, application specific integrated circuits (ASICs), and field-programmable gate arrays (FPGAs).

In various implementations, a processor or processing system may be associated with one or more storage media such as volatile and non-volatile computer memory such as RAM, PROM, EPROM, and EEPROM. The storage media may be encoded with one or more programs that, when executed on one or more processors and/or processing systems, perform the required functions. Thus, there is provided a computer program product comprising computer program code that, when executed on a computing device having a processing system, cause the processing system to perform all of the steps of any herein described method. The computer program may be stored on a non-transitory computer readable medium. Various storage media may be fixed within a processor or processing system or may be transportable, such that the one or more programs stored thereon can be loaded into a processor or processing system.

It will be understood that disclosed methods are preferably computer-implemented methods. As such, there is also proposed the concept of computer program comprising code means for implementing any described method when said program is run on a processing system, such as a computer. Thus, different portions, lines or blocks of code of a computer program according to an embodiment may be executed by a processing system or computer to perform any herein described method. In some alternative implementations, the functions noted in the block diagram(s) or flow chart(s) may occur out of the order noted in the figures. For example, two blocks shown in succession may, in fact, be executed substantially concurrently, or the blocks may sometimes be executed in the reverse order, depending upon the functionality involved.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A computer-implemented method of controlling an operation of a subscriber identity module (SIM) of an electronic device, wherein the SIM is configured to be able to respond to a request from a modem or processing unit of the electronic device with communication data that enables the modem or processing unit to initiate communications with a mobile network, the computer-implemented method comprising:
   determining whether the electronic device and/or the SIM is permitted to communicate using the mobile network, by at least:
      modifying a first counter value, stored by the SIM, upon each unsuccessful connection attempt of the electronic device to the mobile network; and
      determining that the electronic device and/or the SIM is not permitted to communicate using the mobile network in response to the first counter value reaching or breaching a first threshold counter value;
   in response to determining that the electronic device and/or the SIM is not permitted to communicate using the mobile network, modifying contents of the SIM to prevent the SIM from responding to a request from the modem or processing unit of the electronic device with communication data that enables the modem or processing unit to initiate a communication request to the mobile network;
   responding, at the SIM, to a reset communication or reset instruction from a component of the electronic device by setting the first counter value to a first predetermined value;
   modifying a second counter value, stored by the SIM, in response to a reset communication; and
   preventing the first counter value from being set to the first predetermined value in response to the second counter value reaching or breaching a predetermined threshold.

2. The computer-implemented method of claim 1, wherein the step of determining comprises using a remote system, external to the electronic device and/or the SIM, of the mobile network to determine whether the electronic device and/or the SIM is permitted to communicate using the mobile network.

3. The computer-implemented method of claim 2, wherein the step of modifying the contents of the SIM comprises:
   sending an over-the-air (OTA) message from the remote system of the mobile network to the SIM in response to the remote system determining that the electronic device and/or the SIM is not permitted to communicate using the mobile network; and
   the SIM responding to the OTA message by modifying the contents of the SIM to prevent the SIM from responding to the request from the modem or processing unit of the electronic device with communication data that enables the modem or processing unit to initiate the communication request to the mobile network.

4. The computer-implemented method of claim 3, wherein the OTA message comprises computer-implementable instructions, to be executed by the SIM, for modifying the contents of the SIM.

5. The computer-implemented method of claim 2, wherein the step of determining comprises:
   receiving, at the remote system, a connection request from the electronic device;
   determining, at the remote system, whether the electronic device and/or the SIM is permitted to connect to the mobile network in response to the connection request;
   modifying a third counter value, stored by the remote system, each time the electronic device and/or the SIM is not permitted to be connected on the mobile network following the connection request; and
   determining that the electronic device and/or the SIM is not permitted to communicate using the mobile network in response to the third counter value reaching or breaching a second threshold counter value.

6. The computer-implemented method of claim 2, wherein the remote system comprises at least a home location register (HLR).

7. The computer-implemented method of claim 1, wherein the step of determining is performed by the SIM monitoring connection attempts of the electronic device to the mobile network.

8. The computer-implemented method of claim 1, further comprising a step of resetting the first counter value to a second predetermined value in response to the electronic device successfully connecting to the mobile network.

9. The computer-implemented method of claim 1, wherein the reset communication is provided by the component during an authenticated communication session, between the SIM and the component, initiated only when the component provides a secret key to the SIM.

10. The computer-implemented method of claim 1, wherein the step of modifying the contents of the SIM comprises performing one or more of the following steps:
destroying data of the SIM required for providing a valid response to the modem or processing unit for enabling the modem or processing unit to initiate a communication request to the mobile network;
rewriting data of the SIM, required for providing the valid response to the modem or processing unit for enabling the modem or processing unit to initiate the communication request to the mobile network, with invalid values; and/or
adjusting an access permission of the SIM to prevent the SIM from providing the valid response to the modem or processing unit for enabling the modem or processing unit to initiate the communication request to the mobile network.

11. The computer-implemented method of claim 1, further comprising resetting the second counter value in response to the electronic device successfully connecting to the mobile network.

12. A subscriber identity module (SIM) for an electronic device, wherein the SIM is configured to be able to respond to a request from a modem or processing unit of the electronic device with communication data that enables the modem or processing unit to initiate communications with a mobile network, the SIM being adapted to:
determine whether the electronic device and/or the SIM is permitted to communicate using the mobile network, by at least:
modifying a first counter value, stored by the SIM, upon each unsuccessful connection attempt of the electronic device to the mobile network; and
determining that the electronic device and/or the SIM is not permitted to communicate using the mobile network in response to the first counter value reaching or breaching a first threshold counter value; and
in response to determining that the electronic device and/or the SIM is not permitted to communicate using the mobile network, modify contents of the SIM to prevent the SIM from responding to a request from the modem or processing unit of the electronic device with communication data that enables the modem or processing unit to initiate a communication request to the mobile network;
respond to a reset communication or reset instruction from a component of the electronic device by setting the first counter value to a first predetermined value;
modify a second counter value, stored by the SIM, in response to a reset communication; and
prevent the first counter value from being set to the first predetermined value in response to the second counter value reaching or breaching a predetermined threshold.

13. One or more non-transitory computer-readable storage devices comprising computer-executable instructions that, when executed by one or more computer systems, cause the one or more computer systems to perform operations comprising:
determining whether an electronic device and/or a subscriber identity module (SIM) of the electronic device is permitted to communicate using a mobile network, the SIM being configured to be able to response to a request from a modem or processing unit of the electronic device with communication data that enables the modem or processing unit to initiate communications with a mobile network, by at least:
modifying a first counter value, stored by the SIM, upon each unsuccessful connection attempt of the electronic device to the mobile network; and
determining that the electronic device and/or SIM is not permitted to communicate using the mobile network in response to the first counter value reaching or breaching a first threshold counter value;
in response to determining that the electronic device and/or SIM is not permitted to communicate using the mobile network, modifying contents of the SIM to prevent the SIM from responding to a request from the modem or processing unit of the electronic device with communication data that enables the modem or processing unit to initiate a communication request to the mobile network;
responding, at the SIM, to a reset communication or reset instruction from a component of the electronic device by setting the first counter value to a first predetermined value;
modifying a second counter value, stored by the SIM, in response to a reset communication; and
preventing the first counter value from being set to the first predetermined value in response to the second counter value reaching or breaching a predetermined threshold.

14. The one or more non-transitory computer-readable storage devices of claim 13, wherein the step of determining comprises using a remote system, external to the electronic device and/or SIM, of the mobile network to determine whether the electronic device and/or SIM is permitted to communicate using the mobile network.

15. The one or more non-transitory computer-readable storage devices of claim 14, wherein modifying the contents of the SIM further comprises:
sending an over-the-air (OTA) message from the remote system of the mobile network to the SIM in response to the remote system determining that the electronic device and/or SIM is not permitted to communicate using the mobile network; and
the SIM responding to the OTA message by modifying the contents of the SIM to prevent the SIM from responding to the request from the modem or processing unit of the electronic device with communication data that enables the modem or processing unit to initiate the communication request to the mobile network.

16. The one or more non-transitory computer-readable storage devices of claim 15, wherein the OTA message comprises computer-implementable instructions, to be executed by the SIM, for modifying the contents of the SIM.

17. The one or more non-transitory computer-readable storage devices of claim 14, wherein the step of determining further comprises:
receiving, at the remote system, a connection request from the electronic device;
determining, at the remote system, whether the electronic device and/or SIM is permitted to connect to the mobile network in response to the connection request;
modifying a third counter value, stored by the remote system, each time the electronic device and/or SIM is not permitted to be connected on the mobile network following the connection request; and
determining that the electronic device and/or SIM is not permitted to communicate using the mobile network in response to the third counter value reaching or breaching a second threshold counter value.

18. The one or more non-transitory computer-readable storage devices of claim 14, wherein the remote system comprises at least a home location register (HLR).

* * * * *